No. 705,311. Patented July 22, 1902.
J. L. & W. E. ALEXANDER.
CORN HUSKING AND FODDER SHREDDING MACHINE.
(Application filed May 22, 1901.)

(No Model.) 4 Sheets—Sheet 1.

WITNESSES:
Wm H Payne
Alice E Bush

INVENTORS:
John L. Alexander.
Wm. E. Alexander.
BY
E. F. Silvius,
ATTORNEY.

THE NORRIS PETERS CO., PHOTO-LITHO., WASHINGTON, D. C.

No. 705,311. Patented July 22, 1902.
J. L. & W. E. ALEXANDER.
CORN HUSKING AND FODDER SHREDDING MACHINE.
(Application filed May 22, 1901.)
(No Model.) 4 Sheets—Sheet 2.

WITNESSES:
Wm H Payne
Alice E Bush

INVENTORS:
John L. Alexander,
Wm. E. Alexander,
BY E. T. Silvius,
ATTORNEY.

No. 705,311. Patented July 22, 1902.
J. L. & W. E. ALEXANDER.
CORN HUSKING AND FODDER SHREDDING MACHINE.
(Application filed May 22, 1901.)
(No Model.) 4 Sheets—Sheet 3.

WITNESSES:
Wm H Payne
Alice E. Bush

INVENTORS:
John L. Alexander,
Wm. E. Alexander.
BY
E. T. Silvius,
ATTORNEY.

No. 705,311. Patented July 22, 1902.
J. L. & W. E. ALEXANDER.
CORN HUSKING AND FODDER SHREDDING MACHINE.
(Application filed May 22, 1901.)

(No Model.) 4 Sheets—Sheet 4.

WITNESSES:
Wm H Payne
Alice C Bush

INVENTORS
John L. Alexander,
Wm. E. Alexander,
BY
E. T. Silvius,
ATTORNEY.

United States Patent Office.

JOHN L. ALEXANDER AND WILLIAM E. ALEXANDER, OF HAZELRIGG, INDIANA, ASSIGNORS OF ONE-HALF TO EDWARD T. KENNEY, OF INDIANAPOLIS, INDIANA.

CORN-HUSKING AND FODDER-SHREDDING MACHINE.

SPECIFICATION forming part of Letters Patent No. 705,311, dated July 22, 1902.

Application filed May 22, 1901. Serial No. 61,329. (No model.)

*To all whom it may concern:*

Be it known that we, JOHN L. ALEXANDER and WILLIAM E. ALEXANDER, citizens of the United States, residing at Hazelrigg, in the county of Boone and State of Indiana, have invented certain new and useful Improvements in Corn-Husking and Fodder-Shredding Machines; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to the class of machines designed to remove the ears from the stalk and to remove the husks from the ears of corn, and to also shred the stalks and mix the same with the husks, the invention having reference particularly to certain improvements whereby the capacity of machines of this character may be increased, in improvements whereby choking of the operating parts may be prevented and danger of injury to the operator eliminated, and it also refers to means whereby the stalks may be most effectually shredded, and also means whereby the corn that may fall from the cobs may be separated and cleaned from the husks and refuse matter.

The invention also has reference to improvements in the details of construction of the husking-rolls.

Heretofore in machines of this character a single pair of snapping-rolls has been provided for removing the ear of corn from its stalk or from the husk itself, and as such rolls must of necessity be of limited diameter their lengths were limited by their strength to resist the strains put upon them. Hence the machines have been made of less width than is otherwise desirable. In order to avoid this limitation of capacity, we provide additional snapping-rolls combined in a novel manner so as to operate effectively, and we also provide pulling-rolls, which not only prevent choking at the fronts of the snapping-rolls, but also increase the efficiency of the shredders. We also provide a peculiar bending-plate, which further adds to the efficiency of the shredders.

The invention consists in the parts and in the combination and arrangement of parts, as hereinafter particularly described and claimed.

Referring to the drawings, Fig. 5, a rear end elevation of the complete machine; Fig. 6, a fragmentary elevation view of the left-hand side of the machine, showing the relative positions of parts omitted in other views; Fig. 7, a view of the upper pair of snapping-rolls, and Fig. 8 a view of the lower pair of snapping-rolls as seen from the forward end of the machine; Fig. 9, a detail view of the members for pressing the movable one of the snapping-rolls; Fig. 10, a top plan view of the carrier and separator; Fig. 11, a side view of a bracket for supporting the feed-apron frame.

Similar reference characters in the several figures of the drawings designate corresponding parts.

In construction we may employ any suitable form of framework for supporting and inclosing the various operative elements. Various types of journal-bearings and supports therefor may also be adopted, these being obviously matter of mere mechanical expediency.

In the drawings, A designates the machine-frame, which is usually mounted upon carrying-wheels, $a$ indicating the forward end and $b$ the rear end of the frame of the machine. At the forward end of the frame is an adjustable feed-apron frame B, supported pivotally, so that its rear end may rise and fall, and it is so supported that it may be moved also longitudinally or toward and from the snapping-rolls, as may be required, according to the condition of the cornstalks. In effecting this adjustability we preferably provide a pair of housings E, having horizontal slideways $h$, in which are journal-bearings E', fitted so as to slide in the slideways, and a rotative shaft $C^4$ is mounted in the bearings E', the shaft serving both as a pivot for the frame B, through which it extends, and as a means for transmitting motion. A bracket F is suitably supported by the frame A at each side of the rear end of the frame B, and the frame may be secured to the bracket by means of a suitable binder $i$, yet when loose permitting the frame B to be moved longitudinally. The movement of the frame B may be gaged by means of a gage-bar $j$, attached to the frame A and having notches adapted to engage a stud $k$, attached to the frame B, such devices being at each side of the machine, serving also to securely hold the frame B in its desired position. A simple form of means may also be employed for moving the frame B, such as a lever with a quadrant.

At the rear end of the frame B is a driving-roller C, secured to a shaft $C^3$, and the forward end of the frame has a roller C', which is usually adapted to be adjusted so as to tighten the apron-belts B', running over the rollers C and C'. The shaft $C^4$ also preferably has a roller $C^2$, which aids in driving the feed-apron. The frame B may have a floor; but we preferably provide carrying-rollers $C^5$, supplemental to the other rollers described, upon which the feed-apron is supported, all the rollers extending across the frame B. A central belt $B^2$ is also preferable, and to the apron-belts B' $B^2$ a suitable number of flights $B^3$ are secured. In the drawings comparatively few flights are shown, but in practice there are sufficient in number to form a close floor, so as to carry all fragments of fodder that may fall thereon when in operation as they may break off from dry stalks. Above the rear end of the frame B a feed-roll D is mounted so as to press upon the flexible feed-apron between two of its supporting-rollers, being journaled in a suitable frame $d$ or $d'$, pivoted to the shaft $C^4$ and having a pulley $e$, belted to a pulley $f$, secured to the shaft $C^4$, whereby the roll D is driven, the shaft $C^4$ having also a sprocket-wheel 2, by which it is driven by a sprocket-wheel 3 on the shaft $C^3$ and a connecting-chain 4. The shaft $C^3$ also has a sprocket-wheel 5, by which it is driven.

Near the rear end of the frame B is mounted a pair of upper snapping-rolls G and G' and so disposed one above the other that the lower axially-fixed roll G is nearly above the plane of the top of the feed-apron, so that only a portion of the butts of the cornstalks will be projected against it and be carried thereby above it and between the pair of rolls, while the remainder of the stalks fed by the apron will pass below said roll G to a lower pair of snapping-rolls $G^3$ and $G^4$, one above the other, the upper one of which is fixed axially behind and slightly below the axis of the roll G. Each snapping-roll has shallow flutes or longitudinal channels, so that while being adapted to force the ear from the cornstalk without shelling off the corn they also aid in feeding the stalks through, and thus assist in preventing the choking which usually occurs at the fronts of the single pair of snapping-rolls as usually constructed. The roll G is suitably journaled upon frame-bars H H', and the roll $G^3$ is journaled below and to the said bars, while the companion rolls are journaled in movable spring-pressed bearings, as will further appear. The roll G' has suitable journals and is provided with a sprocket-wheel 28, and the companion roll G has similar journals and is provided with a toothed gear-wheel $G^2$, situated at the side of the machine opposite the side at which is the wheel 28. The roll $G^3$ has journals and is provided with a toothed gear-wheel $G^5$, meshing with and driving the wheel $G^2$, and the roll $G^4$ has journals and is provided with a sprocket-wheel 29, situated at the same side of the machine as is the wheel 28.

A pair of pulling-rolls I and I' are mounted, one above the other, at the rear of the two pairs of snapping-rolls above described and so disposed and so proportioned diametrically that the stalks passing between both pairs of snapping-rolls may be drawn between the pulling-rolls, and thereby forcibly fed to the shredders, thus preventing choking of the snapping-rolls as well as the shredders, as the rate of feeding speed is regular. The rolls I and I' are fluted, so that their surfaces present a corrugated appearance, the flutes or channels being broader than the intervening ribs, so that when the stalks are pressed between the rolls the stalks may bend in the flutes without being cut off by the ribs. The roller I is secured to a shaft $I^2$, which is provided with sprocket-wheels 6 and 8 and also a toothed gear-wheel 9. At the opposite end of the roller the shaft $I^2$ is provided with toothed gear-wheels 18 and 19, and the shaft is journaled in bearings 16, suitably supported fixedly. A housing $l$ is secured to the machine-frame and has journal-bearings 12 and 13, supporting an end of the shaft $I^2$, and also journal-bearings 14 and 15, supporting a short shaft $I^5$, to which is secured a toothed wheel 10, meshing with and driven by the wheel 9. The roll I' is secured to a shaft $I^3$, that is shorter than the shaft $I^2$, and is provided with a sprocket-wheel. This shaft is journaled in bearings 17, suitably mounted so as to permit the roll I' to move vertically, as in housings $m$. An end of the shaft $I^3$ has jaw-blades 36, as has also an end of the shaft $I^5$, to form parts of well-known form of universal joints. A short shaft $I^4$ has also similar jaw-blades, each four blades being pivoted to studs 37, forming parts of a spider, as will be understood, so that the shafts $I^3$, $I^4$, and $I^5$ form together a laterally-flexible rotative shaft permitting the roll I' to rise from the roll I in operation while preserving their proper unity of speeds. The wheel 18 drives the wheel $G^5$. Radial arms 20 are pivoted to the shaft $I^3$ and extend forwardly and rotatively support the snapping-roll G'. Similar arms 21 are pivoted to the shaft $I^2$ and likewise support the roll $G^4$, each arm being suitably spring-pressed, so as to force the roll toward its companion roll, and suitable stops may be provided for preventing the rolls from wearing against each other if running empty, and similar provision may be made to protect the rolls I and I'. The arms 20 and 21 may obviously be pivoted to other parts than the shafts adjacent thereto. A sprocket-chain 22 connects the wheel 7 with the wheel 28 and drives the roll G', and a similar chain 23 connects the wheel 8 with the wheel 29 and drives the roll $G^4$. A sprocket-chain 24 connects the wheels 5 and 6 and drives the feed-apron and feed-roll through their connections, as above described.

Below the roll $G^4$ are deflecting oblique-angled shields 26 and 27, extending across the interior of the machine and suitably supported, the shield 26 being adapted to guide the cornstalks upwardly against the roll $G^4$, if any should bend down too much to normally pass above the roll, and the shield also deflects the falling ears toward the husking-rolls. The shield 27 deflects fragments of fodder from the usual husking-roll gearing to the carrier below.

Behind the pulling-rolls are the shredders J, mounted on a shaft $n$ in the usual manner, the shaft being journaled in stationary bearings, as 33, or in housings $q$, and it is provided with a pinion 31, meshing with and driving the wheel 19. This shaft also has a pulley 30, attached to it, with which a belt may be connected for driving the machine. A pulley 32 is also attached to this shaft. Above the shredders is a curved deflecting-plate $p$ to force stray stalks against the shredders.

In order to insure thoroughness in shredding or cutting the cornstalks into suitable fodder, we provide a bending-plate K, which is suitably supported fixedly in a position immediately behind the pull-roll I and close to the shredders J, the operative face of the plate K being curved in concave contour to correspond substantially with the curvature of the periphery of a shredder-knife and provided with ribs 34 and 35, extending from top to bottom obliquely in opposite angles, so that the stalks when struck downwardly by the shredders may be bent downwardly over the top of the plate K and laterally by contact with the ribs as the stalks are agitated by the shredders. In this way the fodder may be cut short besides being shredded without requiring a separate chopping operation.

A suitable means for spring-pressing the movable snapping-rolls and also the pulling-roll is comprised in a bracket $r$, rigidly supported in which is a screw-rod $t$, having a collar 31, which bears upon a spring $u$, seated upon the bearing member in which the roll is journaled.

Figure 1:
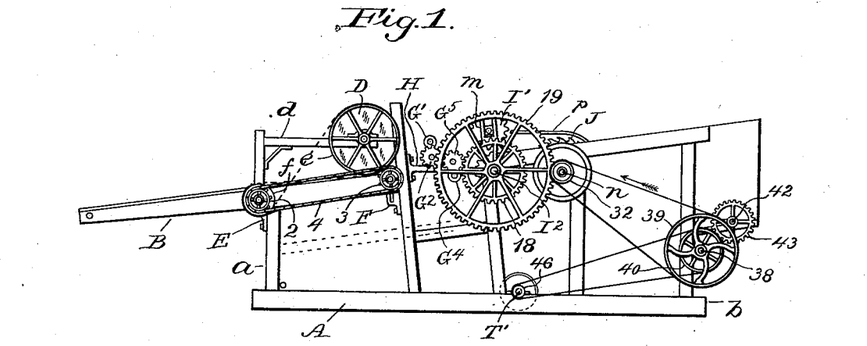
Figure 1 represents a side elevation of a machine having our improvements applied thereto, showing such elements and their relative positions as will give an understanding of the machine as a whole, minor parts being omitted, this being the left-hand side, as usually understood.
Figure 2:
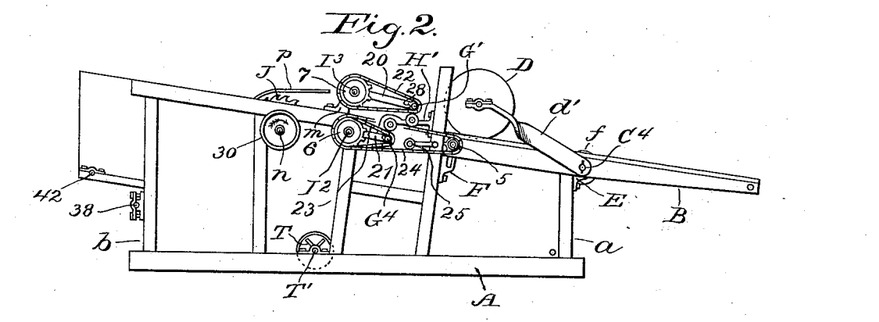
Fig. 2, a side elevation of the opposite or right-hand side, similarly showing principal parts, omitting such parts as would obscure the vision.
Figure 3:
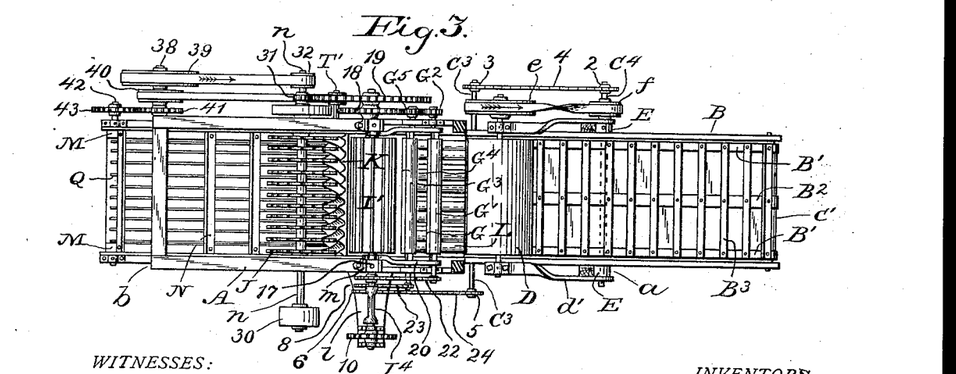
Fig. 3, a top plan view of the complete machine generally, but in which certain parts that might not be easily distinguishable are omitted.
Figure 4:
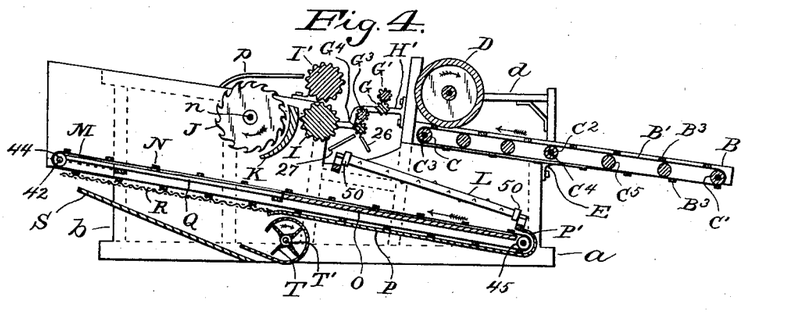
Fig. 4, a longitudinal vertical sectional view showing the trains of coöperating parts mounted within the frame.
Figures 5, 6, 7, 8, 9, 10, 11:
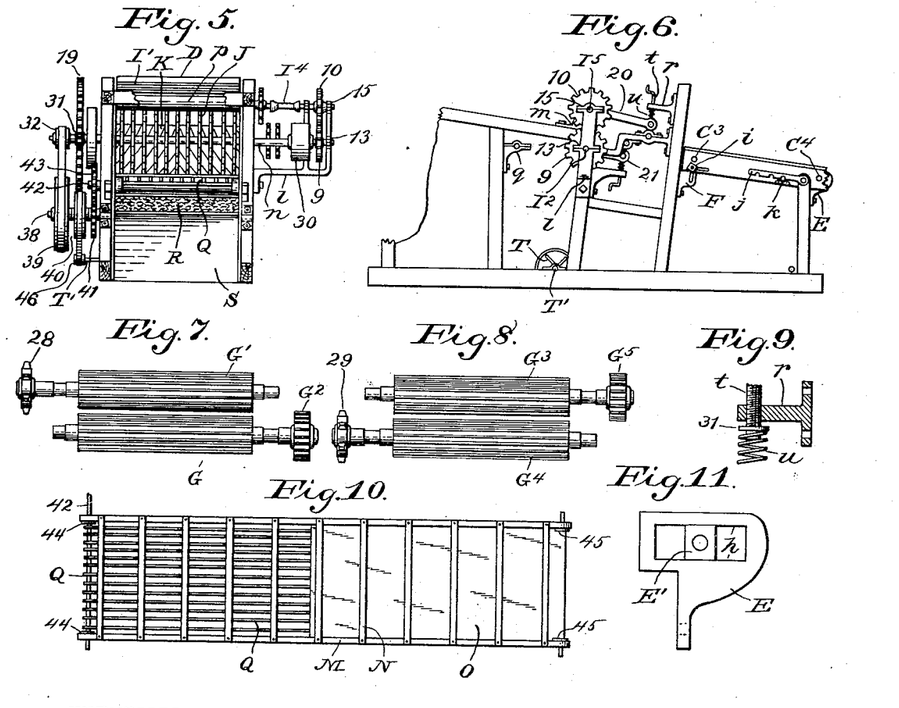
Figure 12:
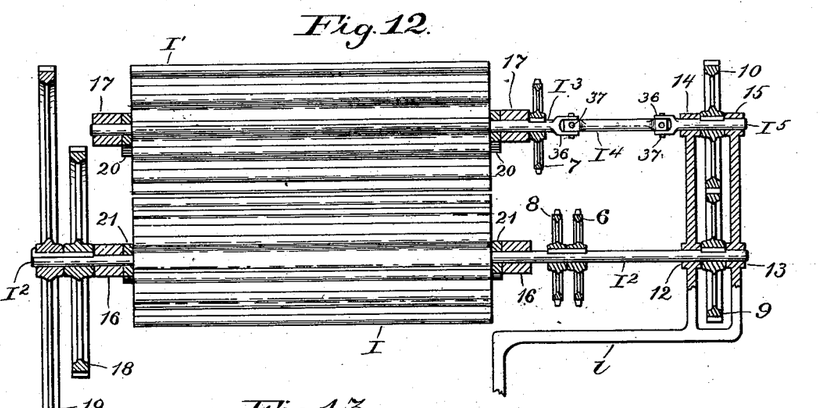
Fig. 12, an enlarged detail view showing the pulling-rolls and their connecting members, especially the means for driving the upper roll while permitting the same to rise and fall and preserving its ratio of speed corresponding to that of the lower companion roll.
Figure 13:
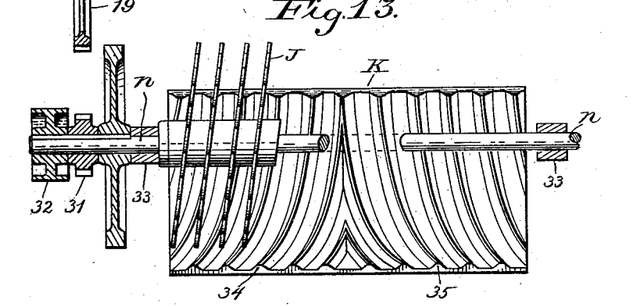
Fig. 13, a fragmentary detail view showing the front of the bending-plate and its relation to the shredders.
Figure 14:
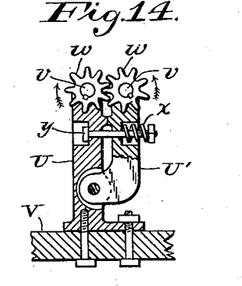
Fig. 14, a detail view showing means for supporting the husking-rolls.
Figure 15:
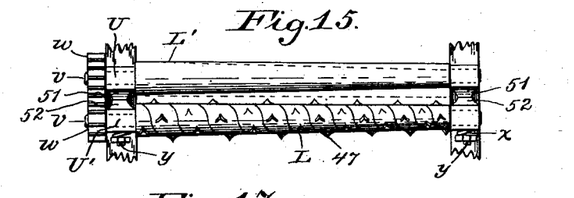
Fig. 15, a top plan view of a pair of husking-rolls, illustrating their character.
Figure 16:
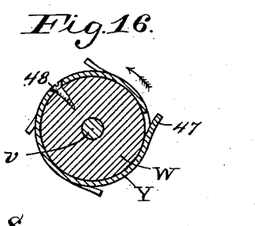
Fig. 16, a transverse sectional view of a husking-roll as preferably constructed.
Figure 17:
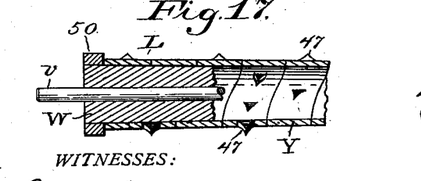
Fig. 17, a fragmentary longitudinal central sectional view of the husking-roll as preferably constructed.
Figure 18:
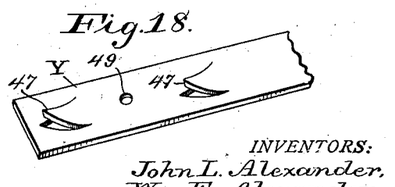
Fig. 18, a fragment of plate on which the teeth for the husking-roll are formed integrally.
Figure 19:
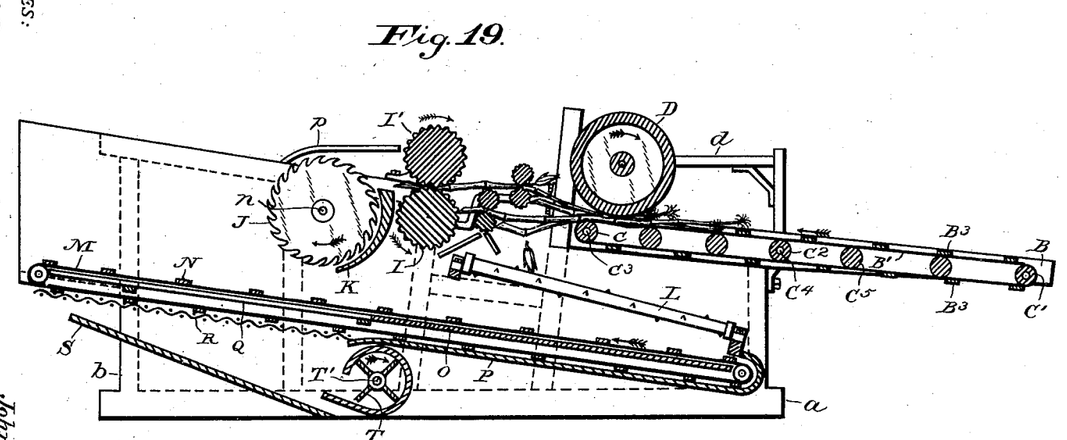
Fig. 19, a reproduction of Fig. 4, on an enlarged scale, with some of the reference-letters omitted in order to show the essential parts clearly, in which the stalks are seen as when going through the snapping-rolls, and the flexion of the feed-belt is shown.
Figure 20:
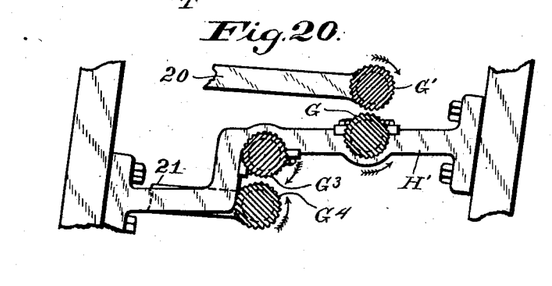
Fig. 20 is an enlarged fragmentary detail showing the relative positions of the snapping-rolls and their supports.

A plurality of husking-rolls L are rotatively journaled and supported in an inclined plane partially below the two pairs of snapping-rolls and partially below the rear portion of the feed-apron frame, and they may be rotated by any suitable system of gearing. The rolls also may be made in the usual manner; but we have devised a husking-roll, which is constructed in a novel manner, that insures the greatest efficiency and economy. In Fig. 15 one of these rolls is shown in connection with a companion roll L', which, together with all the remaining rolls in the series, will be constructed substantially as is the roll L, with metallic journals $v$, a wooden tapering core $w$, and removable spirally-wound metal covering-plates Y, secured to the core, the plates having integral teeth 47 struck up on the outer face thereof or cut out of the metal forming the plates. These plates are preferably made in short sections, so that but a small section need be replaced should a few teeth become damaged. Screws 48 or nails extending through holes 49 into the wooden core W may be suitably used for securing the plates. The form of each tooth 47 is substantially as shown in Figs. 16, 17, and 18, the point of which is adapted to catch and pull off the husk from the ear of corn as the ear is rotated upon two rolls in the usual manner. Inasmuch as the best results are attained when the diameters of the rolls bear a certain relation to the diameters of the ears of corn and as the ears vary in diameter, the husking-rolls are made tapering, so that if the larger ends of the rolls do not operate properly better results may be gained when the ears advance to the smaller ends of the rolls. The husking-rolls are provided with pinions $w$, having long teeth, the shaft $v$ being journaled in stands U, secured to a supporting-beam Y, and also in stand-arms U', pivoted to the stands U, so that the arms alternate with the stands in the series across the machine. In Figs. 14 and 15 is shown a bolt $y$ and a spring $x$, whereby the roll in the arms U' is pressed toward the roll in the stand U, and such bolt may extend through the whole series of stands and arms, if desired, and a suitable number of springs be employed. In some cases the axes of the rolls may be parallel and in other cases they may converge, as indicated by dotted lines in Fig. 15, the rolls being tapering. We provide stops for guarding the teeth 47, as well as the teeth of the wheels $w$, employing either bands 50 at the ends of the rolls or stops 51 and 52 between the stands U and the arms U', and either one of the said stops may obviously be adjustable, if desired.

Below the husking-rolls we mount a carrier of novel form which combines a separator also, and it extends under the shredders to the rear end of the machine. Near the rear end of the frame A is a rotative shaft 38, to which is secured a pulley 39 and a pulley 40, the pulley 39 being belted to the pulley 32. The pulley 40 is belted to a pulley 46, secured to the shaft T' of a fan-blower T of suitable construction, so as to supply a blast projected upwardly and toward the rear of the machine. To the shaft 38 is secured a gear-wheel 41, engaging a gear-wheel 43, secured to a shaft 42 at the rear end of the carrier. This shaft also carries rollers 44 or a single long roller for driving the belts M of the carrier, the said belts running over pulleys 45 or a single long pulley adjustably mounted at the forward end of the carrier. A suitable number of flights N are attached to the belts M, the flights sliding over a floor O, extending from the lower forward ends of the husking-rolls to a point approximately below the plate K, and over a set of grate-bars Q, extending from the floor O to the rear end of the carrier-frame or substantially thereto. The bars are placed so close together that only shelled corn and earthy matter or gravel from the stalks may pass between them, while the husks from below the husking-rolls and the fodder dropping from the shredders are carried by the flights over the grating. Below the grate-bars is a wire screen R, so situated as to be scraped on top by the flights N in their return movements and adapted to permit the grains of corn and other small substances to pass through its meshes. Below the screen is an inclined floor S, extending downwardly below the opening from the case of the fan-blower T, there being an exit for the corn between the floor and the fan-case, while at the upper rear end of the floor S is an exit for the small foreign matter that may be separated from the corn by the blast. At the under side of the path of the returning flights N is a floor P, extending from the screen R to and below the rollers 45 and around the same as a guard P' to and above the forward end of the floor O, so that any fodder or other matter passing down the floor P may be transferred again to the floor O and along to the rear end of the carrier for reseparation.

In order to take up the slack in the chain 24 when the shaft $C^3$ is moved toward the shaft $I^2$, we employ a suspended roller 25, riding upon the chain.

In practical use this machine may be operated in substantially the same manner as are similar machines of this character, and the functions of the several parts will be readily understood, especially in connection with the above description. It may be pointed out, however, that the operator may stand at the forward end of the frame B and feed from the sides onto the feed-apron, so that his hands cannot accidentally get caught between the snapping-rolls, as there will be no occasion for placing a hand near the rolls, choking thereof being entirely prevented with ordinary intelligence exercised in spreading and placing the stalks upon the feed-apron, some of which pass between the upper pair and some of which pass between the lower pair of snapping-rolls, all being gathered by the ribs of the pulling-rolls and drawn between them and thence forced against the shredders. The ears, pinched off the stalks, drop onto the husking-rolls, and being cleanly stripped thereby gravitate to the forward end of the machine, while the husks are carried back with the fodder to the rear end of the machine, the loose grains of corn being separated and cleaned, as before described, and passing out below the fan-case. The apron-frame B may be adjusted to suit the conditions of the stalks, as at times they may be quite dry and at other times they may be damp or wet. When they are very dry, the frame should be moved toward the snapping-rolls and may need to be depressed at its rear end. The proper adjustment may be readily determined by observation in operation, and the advantages of the machine will be readily recognized.

Having thus described our invention, what we claim, and desire to secure by Letters Patent, is—

1. Two pairs of snapping-rolls, one pair mounted in a plane below that of the other pair, each pair comprising two rolls rotating in opposite directions, one roll of the upper pair, and one roll of the lower pair being mounted in movable bearings, and the other rolls in fixed or rigid bearings, and feeding devices having the range of the two pairs of snapping-rolls.

2. Two pairs of snapping-rolls, one pair mounted in a plane below that of the other pair, each pair comprising two rolls rotating in opposite directions, the upper one of the upper pair, and the lower one of the lower pair being mounted in movable bearings, and the other rolls in fixed or rigid bearings, and feeding devices having the range of the lower portion of one of the snapping-rolls in the fixed bearings and also having the range of the upper portion of the other one of the snapping-rolls in the fixed bearings.

3. Two pairs of snapping-rolls, one pair mounted in a plane below that of the other pair, each pair comprising two rolls rotating in opposite directions, one roll of the upper pair, and one roll of the lower pair being mounted in movable bearings, and the other rolls in fixed or rigid bearings, feeding devices having the range of the two pairs of snapping-rolls, and pulling-rolls in range of the two pairs of snapping-rolls.

4. A plurality of pairs of snapping-rolls mounted in different vertically-disposed planes, a pair of rolls in each plane in the rear of another plane, each pair comprising two rolls rotative in opposite directions, one roll of each pair being mounted in movable bearings, and feeding devices having the range of the plurality of pairs of snapping-rolls collectively.

5. Two pairs of snapping-rolls, one pair mounted in a plane below that of the other pair, each pair comprising two rolls rotative in opposite directions, one roll of the upper pair and one roll of the lower pair being mounted in movable bearings, a flexible feeding-apron mounted adjustably to the planes of the two pairs of snapping-rolls, and a feed-roller mounted above the feeding-apron whereby the apron and portions of the stalks thereon may be flexed and the stalks spread toward the two pairs of snapping-rolls.

6. Feeding apparatus comprising a flexible feeding-apron mounted adjustably in a longitudinal direction or forward and backward, a feed-roller mounted above and normally upon the flexible apron whereby the apron and stalks thereon may be flexed and the stalks thereby forced in their passage, and snapping-rolls mounted near the feed-roller and the delivery portion of the flexible feeding-apron.

7. Two pairs of snapping-rolls, one pair mounted in a plane below that of the other pair, each pair comprising two rolls rotating in opposite directions, one roll of the upper pair and one roll of the lower pair being mounted in movable bearings, and the other rolls in fixed or rigid bearings, a feeding apparatus comprising a pivoted frame having its range adjustable as between the two pairs of snapping-rolls, rollers mounted in the frame, a feed-apron mounted upon the rollers, and a feed-roller mounted above the feed-apron.

8. Feeding apparatus comprising a pivoted frame supported movably in a longitudinal direction, rollers mounted in the frame, a feed-apron mounted on the rollers, a feed-roller mounted above the feed-apron, and snapping-rolls mounted near the feed-roller and the rear end of the pivoted frame.

9. The combination of a feeding-apron, a frame supporting the apron and pivotally mounted in movable bearings whereby the frame may be moved longitudinally and also be elevated and depressed at its rear end, a movable feeding member mounted above the feed-apron, snapping-rolls mounted at the rear end of said frame, and shredders, with a combined carrier and separator whereby the fodder from the shredders and the loose grains from the corncobs may be cleaned and separated.

10. In a fodder-shredding machine, a carrier comprising an upper floor, grate-bars extending from the upper floor, a screen situated below the grate-bars, a lower floor extending from the screen, carrier-belts, driving and carrying rollers for the belts, and flights attached to the belts and sliding upon the upper floor and thence upon the grate-bars and also upon the screen and thence upon the lower floor, in combination with shredders mounted above the carrier, snapping-rolls, and feeding apparatus mounted near the snapping-rolls.

11. In a fodder-shredding machine, a carrier comprising an upper floor, grate-bars extending from the upper floor, a screen situated below the grate-bars, a lower floor extending from the screen, carrier-belts, driving and carrying rollers for the belts, flights attached to the belts and sliding upon the upper floor and thence upon the grate-bars and also upon the screen and thence upon the lower floor, an inclined floor situated below the screen, and a fan-blower projecting its blast above the inclined floor and against the under side of the screen, in combination with shredders mounted above the carrier, snapping-rolls, and feeding apparatus mounted near the snapping-rolls.

12. In a fodder-shredding machine, a pulling-roll mounted in stationary bearings, a companion pulling-roll mounted in movable bearings, a movable feeding apparatus, a lower snapping-roll mounted substantially in range of the feeding apparatus between the same and the pulling-rolls and having its axis below a median line drawn between the pulling-rolls to the operative plane of the feeding apparatus, a lower companion snapping-roll mounted below the lower snapping-roll, an upper snapping-roll mounted substantially in range of the feeding apparatus and having its axis above such median line, and an upper companion snapping-roll mounted above the upper snapping-roll, in combination with shredders mounted at the sides of the pulling-rolls opposite the snapping-rolls.

13. In a fodder-shredding machine, the combination of a positive-feed pulling-roll mounted in stationary bearings, a companion pulling-roll mounted in movable bearings, a toothed driving-wheel attached to the shaft of the positive-feed pulling-roll, a lower positive-feed snapping-roll mounted in fixed bearings, a lower companion snapping-roll mounted in movable bearings, a toothed wheel attached to the lower positive-feed snapping-roll and driven by the said driving-wheel, a sprocket-wheel attached to the shaft of the positive-feed pulling-roll, a sprocket-wheel attached to the lower companion snapping-roll, a sprocket-chain connecting the said two sprocket-wheels, means whereby the two pulling-rolls may be driven in unison, an upper positive-feed snapping-roll mounted in fixed bearings in a plane above that of the lower positive-feed snapping-roll, an upper companion snapping-roll mounted in movable bearings, a toothed wheel attached to the upper positive-feed snapping-roll and meshing with the toothed wheel attached to the lower positive-feed snapping-roll, a sprocket-wheel attached to the shaft of the companion pulling-roll, a sprocket-wheel attached to the upper companion snapping-roll, and a sprocket-chain connecting said two last-described sprocket-wheels, with shredders mounted adjacently to the said pulling-rolls, and feeding apparatus mounted adjacently to said snapping-rolls opposite to said pulling-rolls.

14. In a fodder-shredding machine, the combination of a pulling-roll mounted in stationary bearings, a pulling-roll mounted in movable bearings, a rotative shaft mounted in fixed bearings, a toothed wheel secured to the rotating shaft, a toothed wheel connected operatively with the pulling-roll that is mounted in the fixed bearings and driving said wheel on said shaft, a shaft having the universal joints and connected with said rotative shaft and also with the pulling-roll that is mounted in the movable bearings, feeding apparatus, shredders mounted adjacent to the pulling-rolls, and snapping-rolls mounted adjacent to the pulling-rolls between the same and the feeding apparatus, with a main frame supporting the feeding apparatus, supplemental supports for the snapping-rolls and the pulling-rolls, and a housing for the shaft having the universal joints.

15. The combination of the main frame, the frame-bars secured to the main frame, an upper snapping-roll journaled at the tops of said bars in fixed bearings, a lower snapping-roll journaled at the lower sides of said bars in fixed bearings, a plurality of snapping-rolls journaled in movable bearings, one above the upper snapping-roll and coacting therewith, and one below the lower snapping-roll and coacting therewith, with feeding apparatus having the range of said coacting rolls.

16. The combination, with a main frame, and snapping-rolls suitably mounted in the main frame, of a feed-apron frame mounted in the main frame and movable longitudinally toward and from the snapping-rolls, rollers mounted in the feed-apron frame, a feed-apron mounted on the rollers, a feed-roll frame, and a feed-roll mounted in the feed-roll frame and normally riding upon the feed-apron between two of the rollers.

17. The combination, with the feeding apparatus, and the snapping-rolls comprising two pairs of rolls, one pair mounted in a plane below that of the other pair, of fluted pulling-rolls mounted at the rear of the two pairs of snapping-rolls or side opposite to the feeding apparatus, whereby the stalks may be gathered from the two planes of the snapping-rolls into one plane, with the shredders mounted at the rear of the pulling-rolls or side opposite to the snapping-rolls.

18. The combination of the fluted pulling-roll having the extended shaft, the toothed gear-wheel secured to the end of said shaft, the fluted pulling-roll having the flexible shaft, the toothed wheel secured to said flexible shaft and meshing with said toothed wheel on said extended shaft, the snapping-rolls mounted at the front of said pulling-rolls, and the shredders mounted at the rear of said pulling-rolls, with feeding apparatus having the range of the snapping-rolls and also of the said pulling-rolls, and means whereby the rolls may be driven.

19. The combination of the feed-apron frame pivoted between the ends thereof, the driving-shaft coinciding with the pivot for said frame, the feed-apron mounted on said frame, the feed-roll frame pivoted substantially on said driving-shaft, the feed-roll mounted in said feed-roll frame and connected with said driving-shaft, and locking devices for said apron-frame, with snapping-rolls, and means whereby said feed-apron and said shaft may be driven.

20. A combined carrier and separator comprising an upper floor, grate-bars extending from the upper floor, a screen situated below the grate-bars, a lower floor extending from the screen, carrier-belts, driving and carrying rollers for the belts, flights attached to the belts and moving in operation upon the upper floor and thence upon the grate-bars and returning upon the screen and thence upon the lower floor, an inclined floor situated below the screen, and a fan-blower having its blast-orifice directed between the inclined floor and the screen.

21. The combination of two pairs of snapping-rolls, one pair mounted in a plane below that of the other pair, each pair comprising two rolls rotating in opposite directions, one roll of each pair being mounted in movable bearings, feeding devices having the range of the two pairs of snapping-rolls, pulling-rolls in range of the two pairs of snapping-rolls, shredders mounted in range of the pulling-rolls, a combined carrier and separator beneath the shredders and comprising an upper floor, grate-bars extending from the upper floor, a screen situated below the grate-bars, a lower floor extending from the screen, carrier-belts, driving and carrying rollers for the belts, flights attached to the belts and moving in operation upon the upper floor and thence upon the grate-bars and returning upon the screen and thence upon the lower floor, an inclined floor situated below the screen, and a fan-blower having its blast-orifice directed between the inclined floor and the screen, with means whereby the husks and the accidentally-loosened grains of corn separated from the ears may be delivered together upon the upper floor of the combined carrier and separator, whereby the fodder and the husks and the loose grains may be cleaned and separated at one operation, the shredded stalks and the husks being discharged together at the ends of the grate-bars, and the loose grains discharged from the inclined floor.

In testimony whereof we affix our signatures in presence of two witnesses.

JOHN L. ALEXANDER.
WILLIAM E. ALEXANDER.

Witnesses:
C. M. BONNELL,
S. M. RALSTON.